Patented Apr. 13, 1937

2,077,298

UNITED STATES PATENT OFFICE 2,077,298

PROCESS FOR THE EXTRACTION OF HALOGEN FROM FLUIDS

George E. Zelger, Montreuil sous Bois Seine, France, assignor, by mesne assignments, to Eastman Kodak Company, Jersey City, N. J., a corporation of New Jersey No Drawing. Application March 16, 1935, Serial No. 11,465. In France March 31, 1934

18 Claims. (Cl. 23—216)

This invention relates to a process for the extraction of halogen from fluids and, in particular, to a process wherein the extracting agent is a condensation product of a polyvinyl alcohol and an aldehyde.

It is well known that condensation products of a polyvinyl alcohol and an aldehyde can be obtained commercially in various porous and non-porous forms, such as powders, granules, fibres, threads, films, etc.

I have found that these condensation products, in any of the various forms indicated, are capable of readily taking up or sorbing halogen, particularly iodine, from a fluid. The sorption does not appear to be a chemical phenomenon, but rather a purely physical phenomenon, since the sorbed halogen is readily given up by the condensation product under the influence of heat, vacuum, solvents, suitable reactants, etc.

The object, therefore, of this invention is to provide a process for the extraction of halogen from fluids. A further object is to provide a condensation product of a polyvinyl alcohol with an aldehyde, which product contains sorbed halogen. Other objects will become apparent upon a complete perusal of these specifications.

The extraction of halogen from a fluid can be effected using, as a sorbent, a condensation products of a polyvinyl alcohol and an aldehyde or a mixture of such condensation products. In a preferred form of this invention, the sorbent is the well known and readily available condensation product of a polyvinyl alcohol and formaldehyde. Hereinafter, the term, vinyl condensation product is intended to mean the condensation product of a polyvinyl alcohol and formaldehyde.

The sorption of iodine by the vinyl condensation product is particularly marked, although chlorine and bromine are taken up practically as readily as iodine and in a similar manner, especially the bromine. The sorption of the halogen is even more marked in the presence of a halogen salt, such as as metallic halide.

The vinyl condensation product can take up and retain half its weight or more of iodine and becomes colored an intense blue-black. If the iodine and the vinyl condensation product are separated by extracting the iodine from the vinyl condensation product by means of a solvent, or by other means, both the iodine and the vinyl condensation product are found to have retained their original chemical and physical properties.

The products resulting from such sorption are stable, that is, they can be dried and kept in the open. In the case cited above, the concentration of the iodine diminishes slowly in air, owing to spontaneous evaporation, but to a very small extent, the major part being retained by the vinyl derivative.

The extraction of the halogen from a fluid is carried out by merely placing the vinyl condensation product in contact with the fluid containing the halogen. For example, the extraction can be effected by agitating the halogen-containing-fluid with the vinyl condensation product, in a finely divided form. Or, better, the halogen-containing-fluid is allowed to flow through or over a filter made of the vinyl condensation product, the filter being contained in a suitable apparatus. The filter may consist of a porous membrane or a porous mass of the vinyl condensation product.

A convenient filter is made of a porous mass of the vinyl condensation product of such a nature that the halogen-containing-fluid will flow freely through the vinyl condensation product and yet come into intimate contact with its various surfaces. The porous mass may be contained in any suitable apparatus of a convenient form, such as a glass tube, or a Büchner's funnel.

The size and type of apparatus and the amount and nature of the filtering material contained therein will depend upon the quantity and kind of fluid to be subjected to the process. The regulation and adoption of the most economical and useful apparatus and filter will be apparent to those skilled in the art upon observing that particular use to which they wish to put the herein described process.

The vinyl condensation product, in a form suitable for use as a filter, can be prepared as indicated in the following example. Any suitable method of preparation and any suitable form will suffice, however, and this illustration is not intended to be limiting.

*Example 1.*—10 parts of polymerized vinyl alcohol (obtained by saponifying at ordinary temperature 1 molecular proportion of polymerized vinylacetate with 1 molecular proportion of caustic potash, both dissolved in ethyl alcohol, washing the precipitate with alcohol, and drying) are dissolved in 100 parts of water, by heating and stirring; after cooling, 24 parts of hyarochloric acid (D:1,19) and 9 parts of commercial formaldehyde solution (at 40%) are added. The whole is stirred, and thickens gradually; when a slight opalescence indicates that coagulation is starting, the mass is formed in a mould of desired shape, covered, and allowed to stand for several hours, until coagulation is complete. The white, elastic mass of polyvinyl condensation product obtained is washed throughly. The most convenient shape for filtration of liquids is in the form of leaves or sheets, which have, when dry, a hard and horny consistence, but soften quickly when soaked in water, becoming tough, elastic, and very permeable to fluids.

The following examples serve to illustrate the process of extracting halogen from fluids, by means of a vinyl condensation product. These examples are intended merely as illustrations and are not intended to limit the scope of the herein described invention.

*Example 2.*—Water containing 0.25 g. of free iodine per liter is allowed to flow through a filter made of a vinyl condensation product. After one filtration the concentration of iodine in the water is but 0.01 g. per liter. The filter used in this example is made from sheets of vinyl condensation product prepared accordingly to Example 1, and preferably obtained by condensation of a strongly polymerized vinyl alcohol, having a viscosity, for instance of 100° Engler (measured at 2% solution in water, 15° C.). Four sheets in the form of discs having (when wet) a diameter of about 20 centimeters, and a thickness (when wet) of about 2 millimeters are piled in a Büchner's funnel placed upon a suction flask; filtration is made under a low pressure, the pressure inside the flask being about 65 centimeters of mercury.

*Example 3.*—Water containing 0.002 of free iodine per liter is allowed to flow through a filter made of a vinyl condensation product, in the form of a porous membrane. Characteristic blue spots appear on the membrane, indicating a sorption of the iodine. Iodine, in the concentration stated is incapable of giving rise to any known reactions. The membrane used is made from a sheet of vinyl condensation product, prepared as in Example 2; the thickness, when dry, is about one half millimeter. The membrane swells considerably in water, and may reach a thickness, when wet, of several millimeters.

The affinity of the vinyl condensation product for iodine is such that, when it is charged with about 1.32% of its weight, it is still capable of sorbing iodine, when the concentration of iodine in the water with which the derivative is in contact is more than about 0.012% by weight.

If a soluble iodide is present in solution the affinity of the vinyl condensation product for iodine is still more considerable; it can take up about 66% of its weight of iodine, and until this weight of iodine attains about 10%, the surrounding medium need not contain more than about 0.005% of iodine by weight.

The process of extracting halogen described herein is capable of several useful applications. For example, it may be used to extract iodine from the mother liquors obtained from the refining of sea weed ashes, from the mother liquors obtained from the refining of natural saltpeter, etc. The process may also be used to extract iodine from water, into which the iodine has been introduced for purposes of sterilization, the extraction rendering the water potable.

The process may also be used to free a gas, for instance air, from halogen, thus making the air respirable.

The products comprising a condensation product of a polyvinyl alcohol and an aldehyde with halogen sorbed thereon are capable of several useful applications. For example, such products, containing iodine, may be used in the form of bandages, etc. intended to produce asepsis, since such condensation products slowly give up the iodine. The products may be used to prepare solutions of iodine, conveniently and rapidly. For instance, a solution of iodine in alcohol, similar to tincture of iodine, can be prepared by merely immersing the condensation product, containing the iodine, in the alcohol; none of the vinyl derivative dissolves. Or, a solution of iodine in water can be prepared, in the same manner. Thus, a drinking water may be quickly and effectively sterilized.

The products comprising a condensation product of a polyvinyl alcohol and an aldehyde with halogen sorbed thereon are also capable of being used to rid gases of certain impurities. For example, air contaminated with hydrogen sulfide, sulfurous gas or other noxious gases capable of being destroyed by iodine can be purified by passing the impure air through a layer of the iodine charged vinyl derivatives.

In accordance with current nomenclature, the term "sorb" is intended to include the phenomena of absorbing, adsorbing or otherwise occluding.

What I claim as my invention and desire to be secured by Letters Patent of the United States is:

1. A process for extracting halogen from a fluid medium comprising allowing the halogen-containing-fluid to come in contact with a condensation product of a polyvinyl alcohol and an aldehyde.

2. A process for extracting iodine from a fluid medium comprising allowing the iodine-containing-fluid to come in contact with a condensation product of a polyvinyl alcohol and an aldehyde.

3. A process for extracting halogen from a fluid medium comprising allowing the halogen-containing-fluid to come in contact with a condensation product of a polyvinyl alcohol and formaldehyde.

4. A process for extracting iodine from a fluid medium comprising allowing the iodine-containing-fluid to come in contact with a condensation product of a polyvinyl alcohol and formaldeyde.

5. A process for extracting halogen from a liquid medium comprising allowing the halogen-containing-liquid to come in contact with a condensation product of a polyvinyl alcohol and an aldehyde.

6. A process for extracting halogen from a liquid medium comprising allowing the halogen-containing-liquid to come in contact with a condensation product of a polyvinyl alcohol and formaldehyde.

7. A process for extracting iodine from a liquid medium comprising allowing the iodine-containing-liquid to come in contact with a condensation product of a polyvinyl alcohol and formaldehyde.

8. A process for extracting halogen from an aqueous medium comprising allowing the halogen-containing-aqueous medium to come in contact with a condensation product of a polyvinyl alcohol and an aldehyde.

9. A process for extracting halogen from an aqueous medium comprising allowing the halogen-containing-aqueous medium to come in contact with a condensation product of a polyvinyl alcohol and formaldehyde.

10. A process for extracting iodine from an aqueous medium comprising allowing the iodine-containing-aqueous medium to come in contact with a condensation product of a polyvinyl alcohol and formaldehyde.

11. A process for extracting halogen from a gaseous medium comprising allowing the halogen-containing gas to come in contact with a condensation product of a polyvinyl alcohol and an aldehyde.

12. A process for extracting halogen from a gaseous medium comprising allowing the halogen-containing-gas to come in contact with a condensation product of a polyvinyl alcohol and formaldehyde.

13. A process for extracting halogen from air comprising allowing the halogen-containing-air to come in contact with a condensation product of a polyvinyl alcohol and an aldehyde.

14. A process for extracting halogen from air comprising allowing the halogen-containing-air to come in contact with a condensation product of a polyvinyl alcohol and formaldehyde.

15. A product comprising a condensation product of a polyvinyl alcohol and an aldehyde with halogen sorbed thereon.

16. A product comprising a condensation product of a polyvinyl alcohol and formaldehyde with halogen sorbed thereon.

17. A product comprising a condensation product of a polyvinyl alcohol and an aldehyde with iodine sorbed thereon.

18. A product comprising a condensation product of a polyvinyl alcohol and formaldehyde with iodine sorbed thereon.

GEORGE E. ZELGER.